United States Patent
Dinh et al.

(10) Patent No.: US 8,278,552 B2
(45) Date of Patent: Oct. 2, 2012

(54) RUBBER WHILE-IN-USE WEATHERPROOF COVER

(75) Inventors: Cong Thanh Dinh, Collierville, TN (US); Joey Magno, Jr., Cordova, TN (US); Mark R. Drane, Germantown, TN (US); Robert Kevin Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 472 days.

(21) Appl. No.: 12/548,020

(22) Filed: Aug. 26, 2009

(65) Prior Publication Data

US 2010/0051313 A1 Mar. 4, 2010

Related U.S. Application Data

(60) Provisional application No. 61/190,984, filed on Sep. 4, 2008.

(51) Int. Cl.
*H02G 3/14* (2006.01)
(52) U.S. Cl. ........................................... 174/67
(58) Field of Classification Search .................... 174/66, 174/67, 50, 58, 559, 135; 220/241, 242; 439/553, 538
See application file for complete search history.

(56) References Cited

U.S. PATENT DOCUMENTS

| 4,381,063 | A  | * | 4/1983  | Leong .......................... 220/242 |
| D354,736  | S  | * | 1/1995  | Hallett et al. ................ D13/156 |
| 6,987,225 | B2 | * | 1/2006  | Shotey et al. ................... 174/66 |
| 7,097,474 | B1 | * | 8/2006  | Naylor .......................... 439/135 |
| 7,348,486 | B1 | * | 3/2008  | Shotey et al. ................... 174/66 |
| 7,381,894 | B1 |   | 6/2008  | Shotey et al. |
| 7,619,163 | B1 | * | 11/2009 | Shotey et al. ................... 174/67 |
| 7,799,993 | B2 | * | 9/2010  | Drane et al. .................... 174/67 |
| 7,820,910 | B1 | * | 10/2010 | Cleghorn et al. ............... 174/66 |
| 7,939,757 | B1 | * | 5/2011  | Baldwin ......................... 174/67 |
| 8,053,671 | B1 | * | 11/2011 | Shotey et al. ................... 174/67 |

* cited by examiner

*Primary Examiner* — William Mayo, III
(74) *Attorney, Agent, or Firm* — Hoffmann & Baron, LLP (57) ABSTRACT

A while-in use weatherproof cover for an electrical box that includes a faceplate, a base plate and a perimetrical side wall. The base plate has an opening adapted to receive an electrical device and one or more apertures for securing the cover to the device and/or electrical box. The perimeter side wall is flexible and extends from the face plate to the base plate so that the faceplate, the base plate and the side wall define an interior. The faceplate has an opening fitted with a door that is operated by compressing the side wall. The door is movable between an open position, which allows access to the interior, and a closed position, which restricts access to the interior.

19 Claims, 7 Drawing Sheets

RUBBER WHILE-IN-USE WEATHERPROOF COVER

This application claims priority from provisional application Ser. No. 61/190,984, filed on Sep. 4, 2008, which is incorporated herein in its entirety.

FIELD OF THE INVENTION

The present invention relates to a while-in-use cover that encloses an electrical device. More specifically, the present invention relates to a rubber while-in-use cover that has a flexible opening to accommodate the passage of wires and cables into the interior of the cover.

BACKGROUND OF INVENTION

While-in-use covers are well known in the industry and are used to provide an enclosed housing for electrical devices such as electrical receptacles, ground fault circuit interrupters (GFCI), pushbuttons and switches. While-in-use covers can be installed over electrical devices without having to turn off the device and disconnect the wiring. This makes while-in-use covers convenient and easy to use. The purpose of the cover is primarily to protect the electrical device from dust, water, and other foreign materials. It is of particular importance to prevent rain water from contacting the electrical device in order to reduce the risk of short circuits, fire and damage to the device and the electrical system connected to it.

The while-in-use covers currently in use are typically hinged and require the cover to be pivoted into an open position to allow access to the interior of the enclosure. These covers provide protection against water and dust but they generally require a user to use both hands; one hand to hold the cover open and the other hand to insert a plug or operate a device inside the cover. Often, the open cover interferes with the user's ability to access the electrical device. Moreover, these covers often have latches, which prevent the interior from being quickly and conveniently accessed. Accordingly, it is desirable to provide a while-in-use cover that allows quick and easy access to the interior, while at the same time preventing moisture and dust from contacting the electrical device. It is also desirable to provide a while-in-use cover that is durable and can withstand the rough treatment encountered in industrial applications.

SUMMARY OF THE INVENTION

In accordance with the present invention, a while-in use weatherproof cover for an electrical box is provided. The cover includes a faceplate, a base plate and a perimeter side wall. The base plate has an opening adapted to receive an electrical device and one or more apertures for securing the cover to the device and/or electrical box. The perimeter side wall extends from the face plate to the base plate so that the faceplate, the base plate and the side wall define an interior.

The perimetrical side wall of the while-in use weatherproof cover can have a substantially rectangular shape and the perimetrical side wall and/or the faceplate can be flexible. The cover is preferably formed from an elastomeric material and can have a unitary construction. The cover is preferably formed using molding processes that are well known by those skilled in the art.

The faceplate has an opening and a door that fits over the opening and is movable between an open position, which allows access to the interior, and a closed position, which restricts access to the interior. The opening in the faceplate is defined by an edge and has at least one pair of opposing sides. In a first embodiment of the while-in use weatherproof cover, the door is formed by two flexible panels, which are substantially rectangular and have four sides. Preferably, the two flexible panels are attached to the edge of the opening on three sides. The fourth side of one of the flexible panels overlaps the other and forms a slit, which provides access to the interior of the cover.

In a second embodiment of the while-in use weatherproof cover, the door is formed by two panels that are pivotably and resiliently attached to the two opposing sides of the opening. Preferably, a force is applied to push the two panels into the interior of the cover to allow access to the interior. When the force is released, the two panels return to the closed position and block access to the interior of the cover. The sides of the doors opposite the attached sides can overlap and are pliant so that they conform to the outer surfaces of cables passing into the interior of the cover.

In a third embodiment of the while-in use weatherproof cover, access to the interior of the cover is provided by a slit extending at least one third of the distance between the first end and the second ends of the faceplate. The faceplate has an open position that is formed by compressing the opposing sides of the perimetrical side wall to allow access to the interior through the slit, and a closed position that restricts access to the interior when the opposing sides of the perimetrical side wall are not compressed. The slit can extend past the first end and/or the second end of the faceplate to the perimetrical side wall. The slit is defined by a pair of opposing edges which overlap to sealably enclose the interior of the cover, when the cover is in the closed position.

BRIEF DESCRIPTION OF THE FIGURES

The preferred embodiments of the while-in use weatherproof cover of the present invention, as well as other objects, features and advantages of this invention, will be apparent from the accompanying drawings wherein.

DETAILED DESCRIPTION OF THE INVENTION

The present invention is directed to a rubber while-in-use weatherproof cover for an electrical box. The cover has a face plate with an opening and a perimeter side wall that extends from the face plate to a base plate with an opening to define a hollow interior. The opening in the face plate allows access to the interior of the cover. The opening in the base plate provides access to electrical devices when the cover is attached to the front of an electrical box. The base plate can also have one or more mounting screw apertures that are used to attach the cover to the electrical box.

The face plate and perimeter side wall are preferably made of a non-metallic material, most preferably rubber or a soft plastic and the base plate can be made of metal, an elastomeric material (such as rubber) or a plastic material. The face plate, the base plate and the perimeter side wall extending therebetween define the interior of the cover. The face plate has an opening that allows access to the interior. This opening can be formed by overlapping panels, flexible doors or a slit. In the most preferred embodiments, the entire cover (i.e., the face plate, the side walls and the base plate) is made of an elastomeric material formed as a unitary structure using a molding method.

In the first embodiment, the face plate has an opening with a perimetrical edge and the door in the cover is formed by two flexible panels. Access is provided through a door that is formed by two flexible panels attached to the edge of the opening on three sides. Preferably, the panels are substantially rectangular in shape and are attached to the perimetrical edge of the opening on three sides. The unattached fourth sides of each panel extend at least midway between the opposing sides of the opening so that one of the flexible panels overlaps the other to form a slit. Each flexible panel covers about one-half of the opening and the unattached fourth sides overlap so that the opening is completely covered. The flexible panels can be pushed apart to allow access to the interior for connecting a power cord to a receptacle or operating a switch mounted in the electrical box. After the interior is accessed, the flexible panels return to their normal overlapping position wherein they cover the opening and restrict access to the interior. If a power cord is installed through the slit, the flexible panels conform to the outside of the power cord.

In the second embodiment, the opening in the face plate is substantially rectangular in shape, with a pair of opposing sides and a pair of opposing ends, and has an edge extending around the perimeter of the opening. Two flexible doors provide access to the interior of the cover through the opening. The two flexible doors are substantially rectangular in shape and one side of each of these doors is pivotably connected to the edge on opposing sides of the opening. The opposite sides of the doors overlap near the middle of the opening. The edges of the overlapping sides are pliant so that they conform to power cables passing into the interior. Preferably, the doors are connected to the edge of the opening by hinges. The doors pivot inwardly, when a force is applied to the exterior surface, to provide access to the interior of the cover. When the force is released, the doors return to their normal closed position wherein they restrict access to the interior. The flexible door of the second embodiment can be formed by two door sections that are pivotably connected or hinged to the opposing sides of the opening in the face plate. The two door sections have abutting edges that sealably enclose the interior of the cover. When an electrical receptacle is mounted in the electrical box, a user grasps an electrical plug and pushes aside the flexible doors of the cover. The user then inserts the plug in the receptacle and withdraws his or her hand. The flexible doors return to their normal position and the pliant edges of the doors sealably surround the cable attached to the plug.

Figure 7:
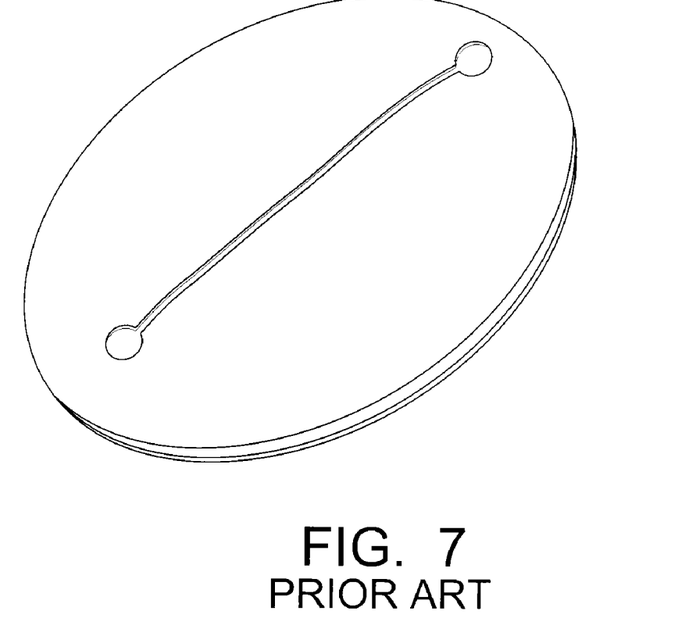
FIG. 7 is a peripheral view of a prior art change purse with a slit for providing access to the interior in the closed position.
Figure 8:
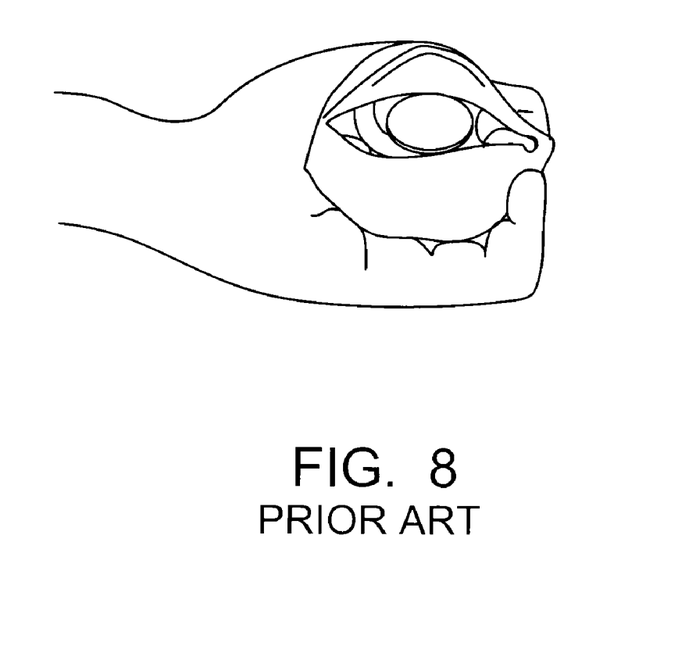
FIG. 8 is a peripheral view of a prior art change purse with a slit for providing access to the interior in the open position.

In a third embodiment, access to the interior of the cover is provided by a slit extending at least one third of the distance between the first end and the second end of the faceplate. The slit is normally closed to restrict access to the interior of the cover. Preferably, the slit extends the full length of the faceplate but can extend as far as the middle of the perimeter side wall. To open the cover, the opposing sides of the side wall are pressed inwardly towards each other. This flexes the opposing edges of the slit apart and allows a user to access the interior of the cover. Releasing the pressure on the side wall causes the side wall to return to its normally closed position and restricts access to the interior. Typically, the user presses the side wall of the cover at either end of the slit to separate the opposing edges of the slit in a manner similar to a squeeze coin purse (as shown in FIGS. 7 and 8). Preferably, the cover is made of an elastomeric material and the edges on the opposing sides of the slit form a seal when the cover is in the closed position.

Figure 1:
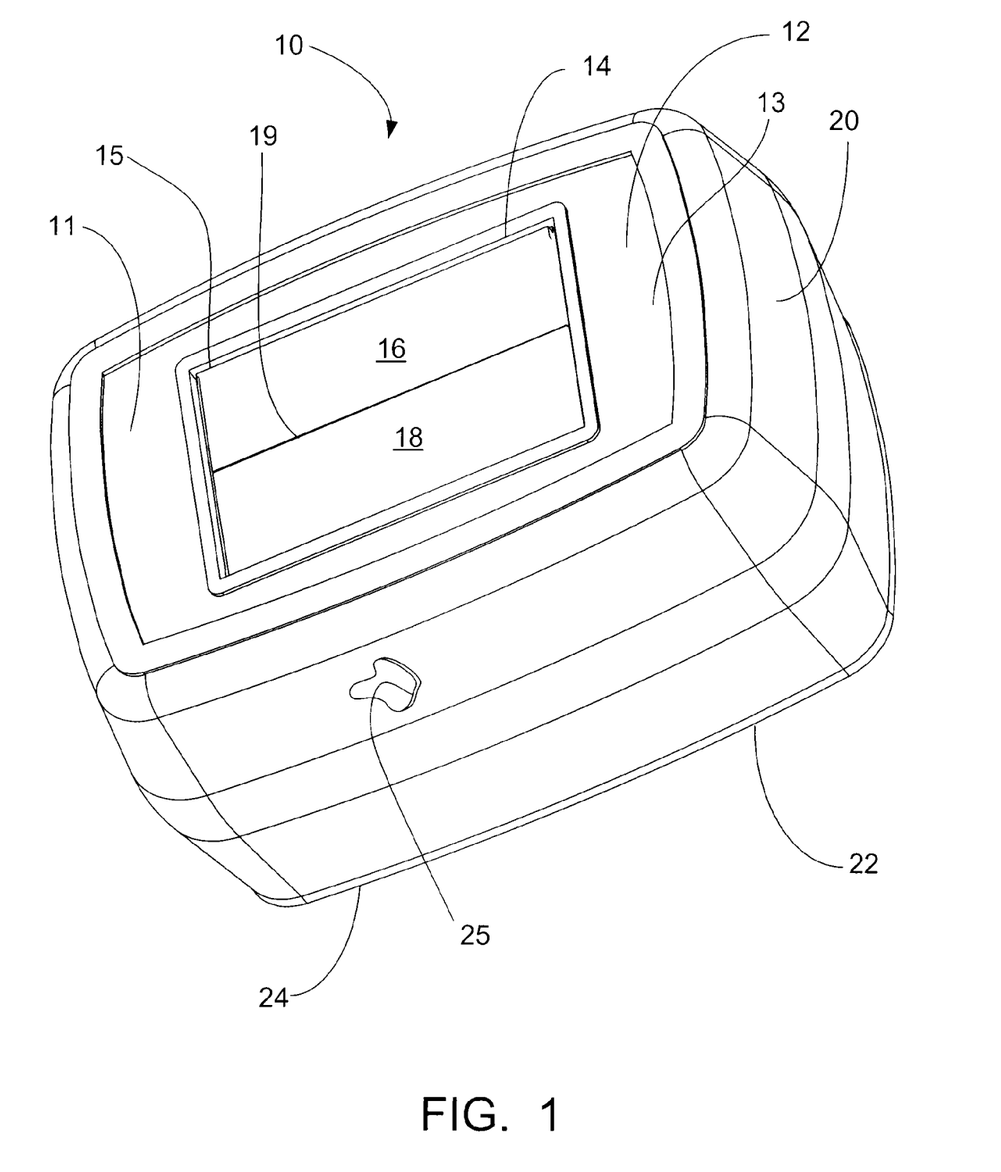
FIG. 1 is a peripheral front view of the first embodiment of the rubber while-in-use cover of the present invention with two flexible panels.

FIG. 1 shows the first embodiment of the cover 10 formed by a side wall 20 extending between a face plate 12 and a bottom edge 22 on the perimeter of the base plate 24. The face plate 12 has an opening 14 with an edge 15 around the opening 14 and two flexible panels 16, 18. The face plate 12 has first and second ends 11, 13. The two flexible panels 16, 18 are connected to the edge 15 of the opening 14 in the face plate 12 on three sides. The two flexible panels 16, 18 are pushed inwardly to access the interior 25 of the cover 10. The panels 16, 18 overlap with each other to form a slit 19. The flexible panels 16, 18 can be moved apart to allow access to the interior 25 through the slit 19.

Figure 2:
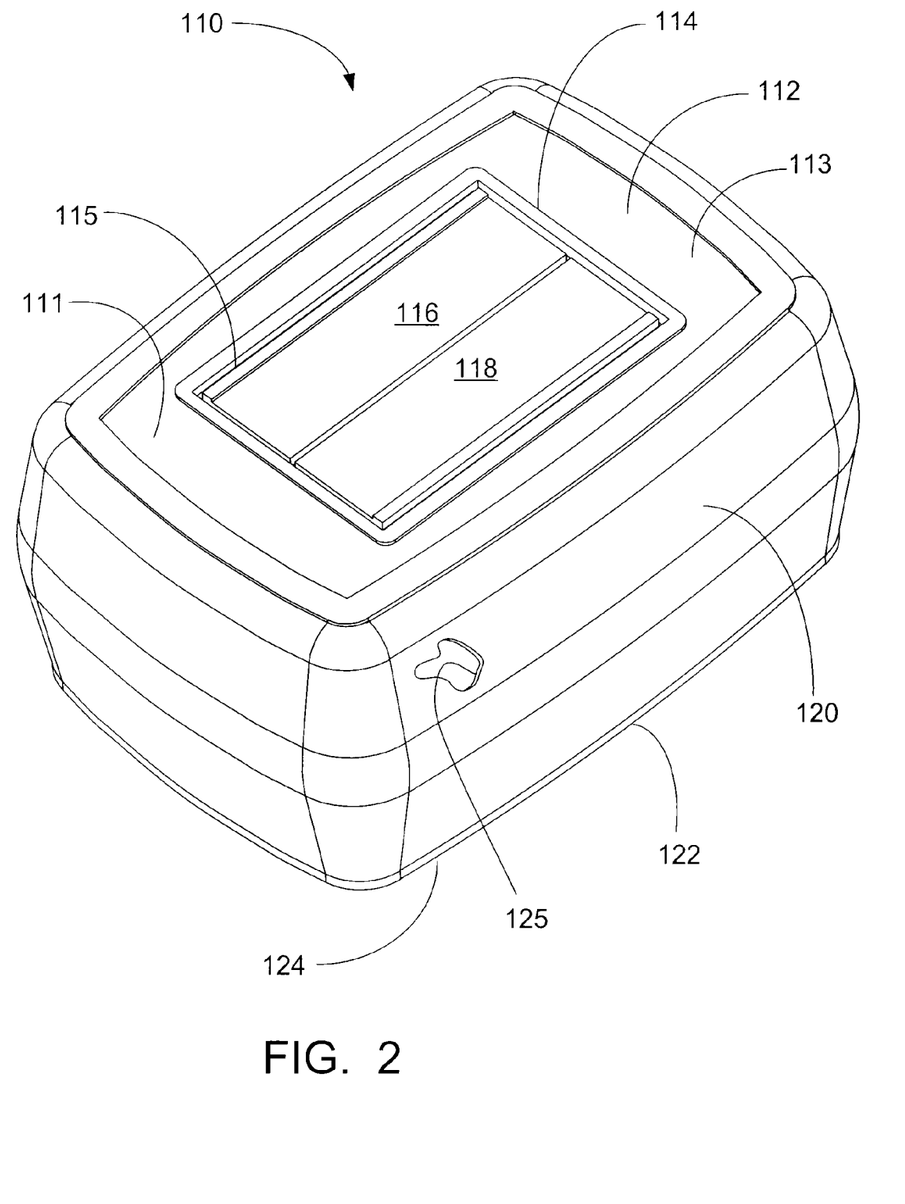
FIG. 2 is a peripheral front view of the second embodiment of the rubber while-in-use cover of the present invention with two flexible doors.

FIG. 2 shows the second embodiment of the cover 110 with a face plate 112 having first and second ends 111, 113 and an opening 114 in the face plate 112 with two flexible door sections 116, 118 pivotably mounted to the edge 115 of the opening 114 on opposing sides. A side wall 120 extends from the face plate 112 to a bottom edge 122 on the perimeter of the base plate 124. The two flexible doors 116, 118 are connected to the opposing sides of the opening 114 and are pushed inwardly to access the interior 125 of the cover 110. The flexible doors 116, 118 return to a closed position and restrict access to the interior 125 when the pressure is released.

Figure 3:
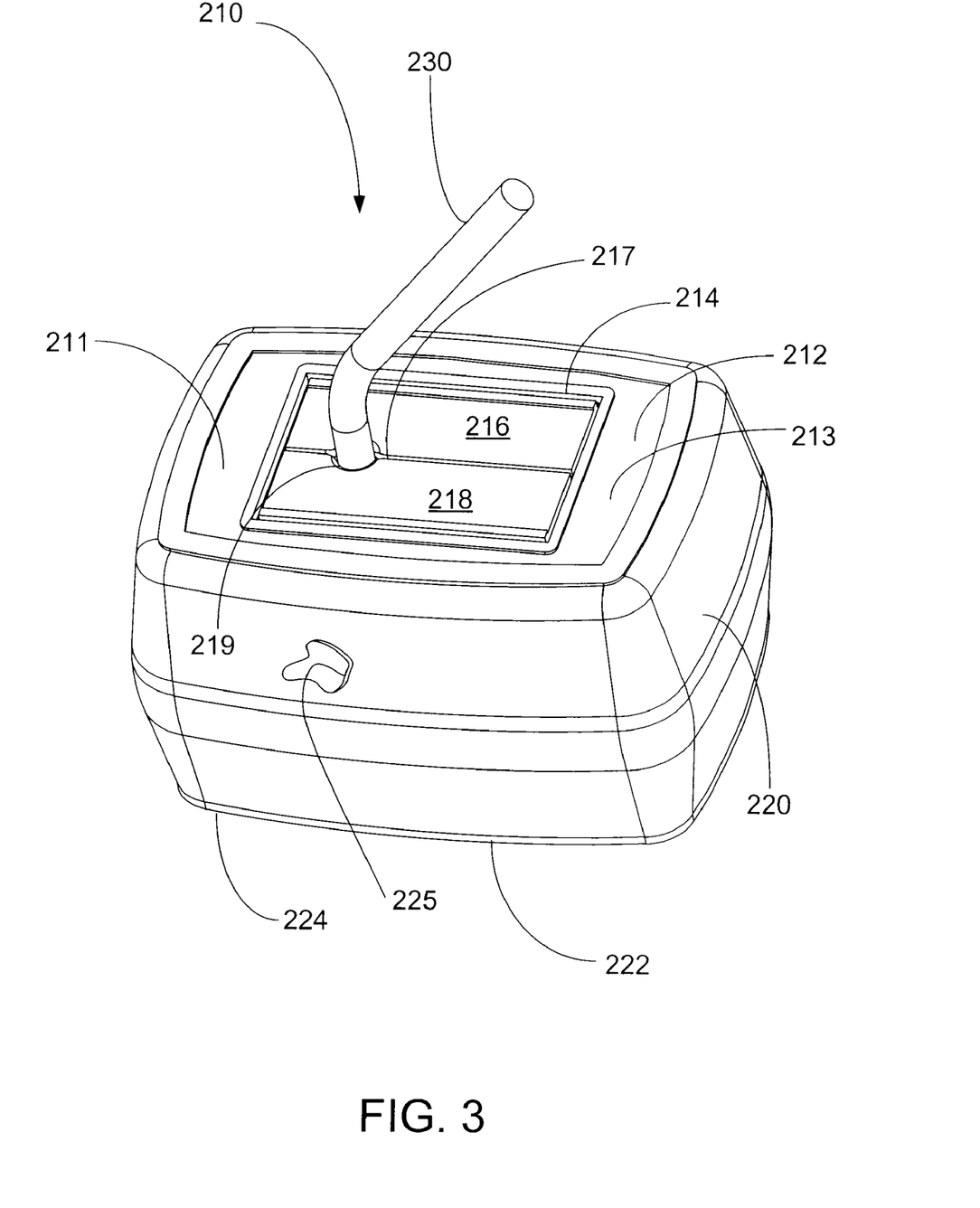
FIG. 3 is a peripheral front view of the second embodiment of the rubber while-in-use cover of FIG. 2 with a cable extending through the two flexible doors.

FIG. 3 shows the second embodiment of the cover 210 with a face plate 212 having first and second ends 211, 213 and an opening 214 in the face plate 212 with two flexible door sections 216, 218. A side wall 220 extends from the face plate 212 to a bottom edge 222 on the perimeter of the base plate 224. The two flexible door sections 216, 218 are connected to the opposing sides of the opening 214 and are pushed inwardly to access the interior 225 of the cover 210. An electrical cable 230 extends through the flexible door sections 216, 218 and the pliant edges 217, 219 of the flexible door sections 216, 218 conform to and sealably receive the cable 230.

Figure 4:
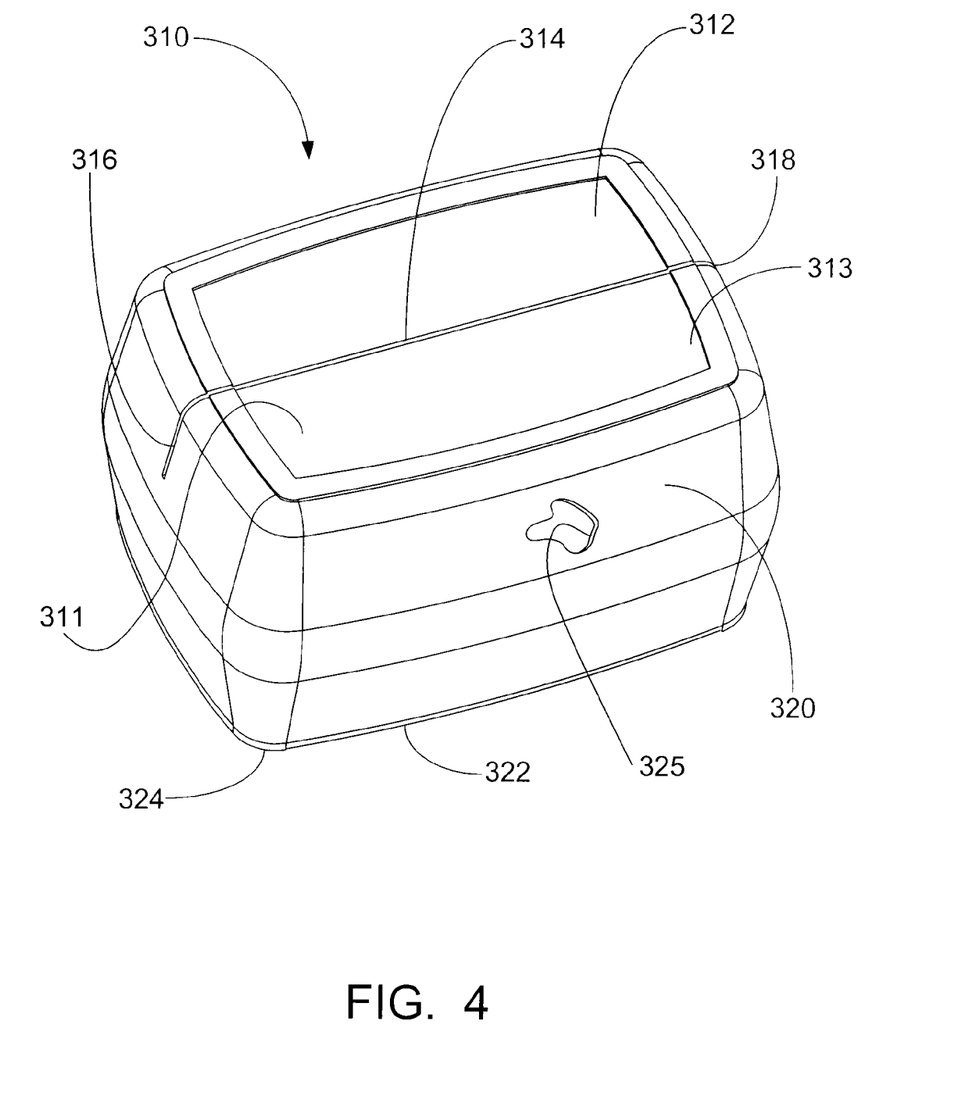
FIG. 4 is a peripheral front view of the third embodiment of the rubber while-in-use cover of the present invention with a slit providing access to the interior.

FIG. 4 shows the third embodiment of the cover 310 with a face plate 312 having first and second ends 311, 313 and a slit 314 in the face plate 312 with two opposing ends 316, 318. A side wall 320 extends from the face plate 312 to a bottom edge 322 on the perimeter of the base plate 324. The slit 314 extends beyond the first and second ends 311, 313 of the faceplate 312 so that the opposing ends 316, 318 of the slit 314 are located in the side wall 320. The slit 314 opens to provide access to the interior 325 of the cover 310 when the user pushes inwardly on the side wall 320 of the cover 310 near the two opposing ends 316, 318 of the slit 314. When the pressure on the side wall 320 is released, the cover 310 returns to its original shape and access to the interior 325 is restricted.

Figure 5:
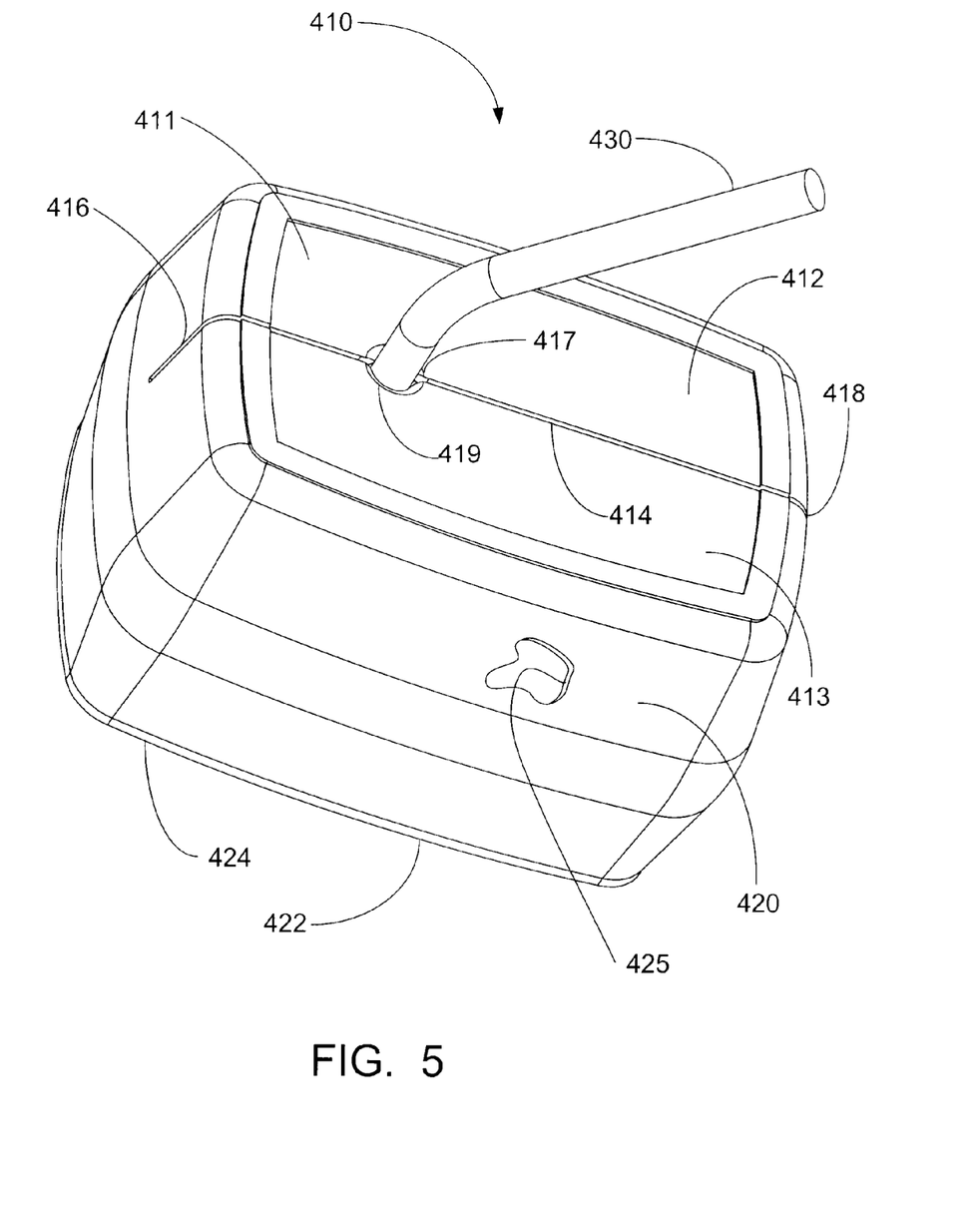
FIG. 5 is a peripheral front view of the third embodiment of the rubber while-in-use cover of FIG. 4 with a cable extending through the slit.

FIG. 5 shows an embodiment of the cover 410 with a face plate 412 having first and second ends 411, 413 and a slit 414 in the face plate 412 with two opposing ends 416, 418. A side wall 420 extends from the face plate 412 to a bottom edge 422 on the perimeter of the base plate 424. The slit 414 can open to provide access to the interior 425 of the cover 410 when the user pushes inwardly on the side wall 420 of the cover 410 near the two opposing ends 416, 418 of the slit 414. An electrical cable 430 extends through the slit 414 and the pliant opposing edges 417, 419 of the slit 414 conform to and sealably receive the cable 430.

Figure 6:
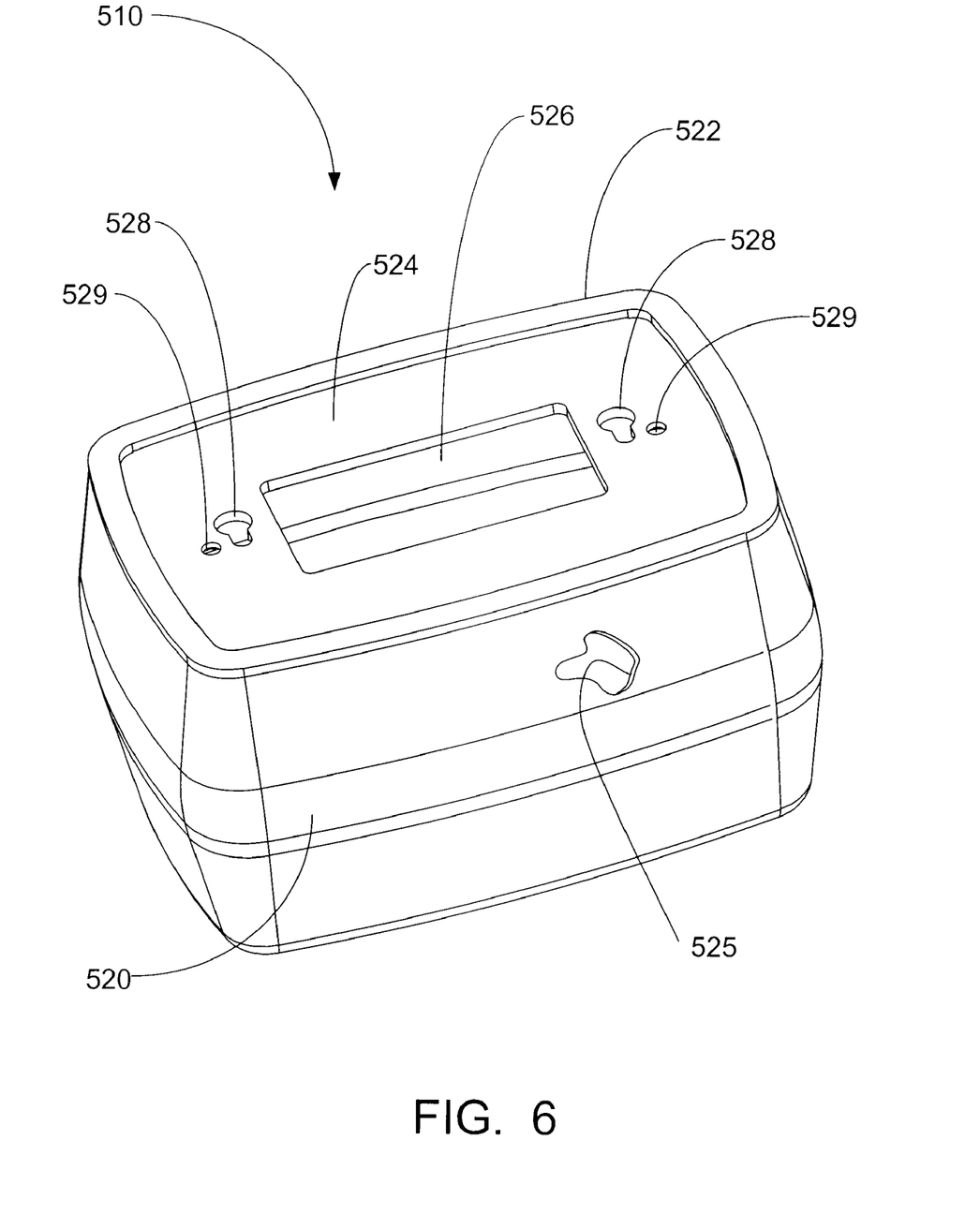
FIG. 6 is a peripheral rear view of the rubber while-in-use cover of the present invention.

FIG. 6 shows a rear view of a cover 510 that is substantially the same for all three embodiments of the invention. The base plate 524 shown can be used with the different faceplates described above in relation to FIGS. 1-5. The base plate 524 has an opening 526 for receiving an electrical device (not shown) and extends inwardly from a bottom edge 522 where the side wall 520 connects to the base plate 524. The side wall 520 extends from the base plate 524 to a faceplate (not shown) and defines an interior 525. The base plate 524 has a pair of keyhole apertures 528 and a pair of round apertures 529 for securing the cover 510 to the electrical device and/or the electrical box (not shown).

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A while-in use weatherproof cover for an electrical box, the cover comprising:
    a faceplate having an opening, wherein the opening is defined by an edge;
    a base plate having an opening adapted to receive an electrical device and one or more apertures for securing the cover to the electrical device or the electrical box;
    a perimetrical side wall extending from the face plate to the base plate, wherein the faceplate, the base plate and the side wall define an interior; and
    a door formed by two flexible panels attached to opposing sides of the edge defining the opening in the faceplate, wherein the two flexible panels overlap and form a slit, and wherein the door provides access to the interior through the slit and is movable between an open position, which allows access to the interior, and a closed position, which restricts access to the interior.

2. The while-in use weatherproof cover according to claim 1, wherein the perimetrical side wall has a substantially rectangular shape.

3. The while-in use weatherproof cover according to claim 1, wherein the perimetrical side wall is flexible.

4. The while-in use weatherproof cover according to claim 1, wherein the faceplate and the perimetrical side wall are flexible.

5. The while-in use weatherproof cover according to claim 1, wherein the two flexible panels are substantially rectangular and have four sides, and wherein the two flexible panels are attached to the edge of the opening on three sides.

6. The while-in use weatherproof cover according to claim 1, wherein the cover is formed from an elastomeric material.

7. The while-in use weatherproof cover according to claim 1, wherein the cover is formed as a unitary construction.

8. A while-in use weatherproof cover for an electrical box, the cover comprising:
    a faceplate having an opening, wherein the opening has two opposing sides;
    a base plate having an opening adapted to receive an electrical device and one or more apertures for securing the cover to the electrical box;
    a flexible perimetrical side wall extending from the face plate to the base plate, wherein the faceplate, the base plate and the perimetrical side wall define an interior; and
    a pair of flexible doors, wherein the door provides access to the interior through the opening in the faceplate and the two flexible doors are attached to the two opposing sides of the opening in the faceplate.

9. The while-in use weatherproof cover according to claim 8, wherein the two flexible doors are flexibly movable between an open position, which allows access to the interior, and a closed position, which restricts access to the interior.

10. The while-in use weatherproof cover according to claim 8, wherein the two flexible doors are pivotably attached to the two opposing sides of the opening.

11. The while-in use weatherproof cover according to claim 8, wherein the two flexible doors are attached to hinges on the two opposing sides of the opening.

12. The while-in use weatherproof cover according to claim 8, wherein the perimetrical side wall has a substantially rectangular shape.

13. The while-in use weatherproof cover according to claim 8, wherein the cover is formed from an elastomeric material.

14. The while-in use weatherproof cover according to claim 8, wherein the cover is formed as a unitary construction.

15. A while-in use weatherproof cover for an electrical box, the cover comprising:
    a faceplate comprising a first end and a second end, wherein the first end and the second end are separated by a distance;
    a base plate having an opening adapted to receive an electrical device and one or more apertures for securing the cover to the electrical box;
    a perimetrical side wall having opposing sides and extending from the face plate to the base plate, wherein the faceplate, the base plate and the perimetrical side wall define an interior; and
    a slit extending at least one third of the distance between the first end and the second end of the faceplate, wherein the faceplate has an open position that is formed by compressing the opposing sides of the perimetrical side wall to allow access to the interior through the slit, and a closed position that restricts access to the interior when the opposing sides of the perimetrical side wall are not compressed.

16. The while-in use weatherproof cover according to claim 15, wherein the slit extends past the first end and the second end of the faceplate to points on opposing sides of the perimetrical side wall.

17. The while-in use weatherproof cover according to claim 15, wherein the cover is formed from an elastomeric material.

18. The while-in use weatherproof cover according to claim 15, wherein the cover is formed as a unitary construction.

19. The while-in use weatherproof cover according to claim 15, wherein the slit sealably encloses the interior of the cover, when the cover is in the closed position.

* * * * *